(12) United States Patent
Wang et al.

(10) Patent No.: US 7,406,556 B2
(45) Date of Patent: Jul. 29, 2008

(54) METHOD FOR READING AND WRITING NON-STANDARD REGISTER OF STANDARD INTERFACE DEVICE

(75) Inventors: Jar-Haur Wang, Hsin-Tien (TW); Yen-Bo Lai, Hsin-Tien (TW)

(73) Assignee: Via Technologies Inc., Taipei County (TW)

( * ) Notice: Subject to any disclaimer, the term of this patent is extended or adjusted under 35 U.S.C. 154(b) by 193 days.

(21) Appl. No.: 11/329,091

(22) Filed: Jan. 11, 2006

(65) Prior Publication Data

US 2006/0294284 A1     Dec. 28, 2006

(30) Foreign Application Priority Data

Jun. 24, 2005     (TW)     ............................... 94121227 A

(51) Int. Cl.
*G06F 13/14*     (2006.01)

(52) U.S. Cl. ........................... 710/305; 710/72; 710/74

(58) Field of Classification Search ......... 710/305–311, 710/104–105, 36–38, 4–5, 58–61, 72–74; 711/154–157, 170–173

See application file for complete search history.

(56) References Cited

U.S. PATENT DOCUMENTS

| 6,728,830 | B1 * | 4/2004 | Assaf | ........................ 711/112 |
|---|---|---|---|---|
| 6,772,108 | B1 * | 8/2004 | Stolowitz | ..................... 703/27 |
| 6,941,405 | B2 * | 9/2005 | Morrow | ..................... 710/305 |
| 7,010,638 | B2 * | 3/2006 | Deng et al. | ................. 710/306 |
| 2002/0186706 | A1 * | 12/2002 | Chien et al. | ................. 370/461 |
| 2004/0054840 | A1 * | 3/2004 | Berg et al. | ................. 710/306 |

* cited by examiner

*Primary Examiner*—Raymond N Phan
(74) *Attorney, Agent, or Firm*—Rosenberg, Klein & Lee

(57) ABSTRACT

A method for reading and writing non-standard register of standard interface device is disclosed. An input no-available parameter of standard command is set as an executive parameter. While receiving the standard command the standard interface device detects executive parameter for reading corresponding value of non-standard register and saving the value into an output register corresponding to output no-available parameter in response to the standard command. Then users can read the value of the output register to learn value of non-standard register. Moreover, by setting the input no-available parameters of standard command as executive parameter and data parameter, standard command with executive parameter and data parameter is sent into the standard interface device. Thus the standard interface device detects the executive parameter so as to write the data parameter into the non-standard register corresponding to the executive parameter.

24 Claims, 16 Drawing Sheets

| Register | 7 | 6 | 5 | 4 | 3 | 2 | 1 | 0 |
|---|---|---|---|---|---|---|---|---|
| Features | | | | na | | | | |
| Sector Count | | | | na | | | | |
| LBA Low | | | | na | | | | |
| LBA Mid | | | | na | | | | |
| LBA High | | | | na | | | | |
| Device | obs | na | obs | DEV | na | na | na | na |
| Command | | | | DFh | | | | |

| Register | 7 | 6 | 5 | 4 | 3 | 2 | 1 | 0 |
|---|---|---|---|---|---|---|---|---|
| Error | | | | na | | | | |
| Sector Count | | | | na | | | | |
| LBA Low | | | | na | | | | |
| LBA Mid | | | | na | | | | |
| LBA High | | | | na | | | | |
| Device | obs | na | obs | DEV | na | na | na | na |
| Status | BSY | DRDY | DF | na | DRQ | na | na | ERR |

| Register | 7 | 6 | 5 | 4 | 3 | 2 | 1 | 0 |
|---|---|---|---|---|---|---|---|---|
| Features | na | | | | | | | |
| Sector Count | na | | | | | | | |
| LBA Low | na | | | | | | | |
| LBA Mid | na | | | | | | | |
| LBA High | na | | | | | | | |
| Device | obs | na | obs | DEV | na | na | na | na |
| Command | DFh | | | | | | | |

Fig. 1A

| Register | 7 | 6 | 5 | 4 | 3 | 2 | 1 | 0 |
|---|---|---|---|---|---|---|---|---|
| Error | na | | | | | | | |
| Sector Count | na | | | | | | | |
| LBA Low | na | | | | | | | |
| LBA Mid | na | | | | | | | |
| LBA High | na | | | | | | | |
| Device | obs | na | obs | DEV | na | na | na | na |
| Status | BSY | DRDY | DF | na | DRQ | na | na | ERR |

Fig. 1B

| Register | 7 | 6 | 5 | 4 | 3 | 2 | 1 | 0 |
|---|---|---|---|---|---|---|---|---|
| Features | na | | | | | | | |
| Sector Count | na | | | | | | | |
| LBA Low | na | | | | | | | |
| LBA Mid | ACh | | | | | | | |
| LBA High | na | | | | | | | |
| Device | obs | na | obs | DEV | na | na | na | na |
| Command | DFh | | | | | | | |

Fig. 3A

| Register | 7 | 6 | 5 | 4 | 3 | 2 | 1 | 0 |
|---|---|---|---|---|---|---|---|---|
| Error | na | | | | | | | |
| Sector Count | na | | | | | | | |
| LBA Low | na | | | | | | | |
| LBA Mid | 60h | | | | | | | |
| LBA High | na | | | | | | | |
| Device | obs | na | obs | DEV | na | na | na | na |
| Status | BSY | DRDY | DF | na | DRQ | na | na | ERR |

Fig. 3B

| Register | 7 | 6 | 5 | 4 | 3 | 2 | 1 | 0 |
|---|---|---|---|---|---|---|---|---|
| Features | | | na | | | | | |
| Sector Count | | | na | | | | | |
| LBA Low | | | na | | | | | |
| LBA Mid | | | 11h | | | | | |
| LBA High | | | AEh | | | | | |
| Device | obs | na | obs | DEV | na | na | na | na |
| Command | | | DFh | | | | | |

Fig. 5

| Register | 7 | 6 | 5 | 4 | 3 | 2 | 1 | 0 |
|---|---|---|---|---|---|---|---|---|
| Features | | | | na | | | | |
| Sector Count | | | | na | | | | |
| LBA Low | | | | 2Dh | | | | |
| LBA Mid | | | | FCh | | | | |
| LBA High | | | | na | | | | |
| Device | obs | na | obs | DEV | na | na | na | na |
| Command | | | | DFh | | | | |

Fig. 7

| Register | 7 | 6 | 5 | 4 | 3 | 2 | 1 | 0 |
|---|---|---|---|---|---|---|---|---|
| Features | | | na | | | | | |
| Sector Count | | | na | | | | | |
| LBA Low | | | 23h | | | | | |
| LBA Mid | | | FFh | | | | | |
| LBA High | | | ADh | | | | | |
| Device | obs | na | obs | DEV | na | na | na | na |
| Command | | | DFh | | | | | |

Fig. 9

| Register | 7 | 6 | 5 | 4 | 3 | 2 | 1 | 0 |
|---|---|---|---|---|---|---|---|---|
| Features | | | | na | | | | |
| Sector Count | | | | 01h | | | | |
| LBA Low | | | | 02h | | | | |
| LBA Mid | | | | 03h | | | | |
| LBA High | | | | na | | | | |
| Device | obs | na | obs | DEV | na | na | na | na |
| Command | | | | DFh | | | | |

Fig. 12

| Register | 7 | 6 | 5 | 4 | 3 | 2 | 1 | 0 |
|---|---|---|---|---|---|---|---|---|
| Features | na ||||||||
| Sector Count | 01h ||||||||
| LBA Low | na ||||||||
| LBA Mid | na ||||||||
| LBA High | na ||||||||
| Device | obs | na | obs | DEV | na | na | na | na |
| Command | DFh ||||||||

Fig. 13A

| Register | 7 | 6 | 5 | 4 | 3 | 2 | 1 | 0 |
|---|---|---|---|---|---|---|---|---|
| Features | na ||||||||
| Sector Count | 02h ||||||||
| LBA Low | na ||||||||
| LBA Mid | na ||||||||
| LBA High | na ||||||||
| Device | obs | na | obs | DEV | na | na | na | na |
| Command | DFh ||||||||

Fig. 13B

| Register | 7 | 6 | 5 | 4 | 3 | 2 | 1 | 0 |
|---|---|---|---|---|---|---|---|---|
| Features | na ||||||||
| Sector Count | 03h ||||||||
| LBA Low | na ||||||||
| LBA Mid | na ||||||||
| LBA High | na ||||||||
| Device | obs | na | obs | DEV | na | na | na | na |
| Command | DFh ||||||||

Fig. 13C

| Register | 7 | 6 | 5 | 4 | 3 | 2 | 1 | 0 |
|---|---|---|---|---|---|---|---|---|
| Features | | | | 01h | | | | |
| Sector Count | | | | 02h | | | | |
| LBA Low | | | | 03h | | | | |
| LBA Mid | | | | 11h | | | | |
| LBA High | | | | AEh | | | | |
| Device | obs | na | obs | | DEV | na | na | na |
| Command | | | | DFh | | | | |

Fig. 15

METHOD FOR READING AND WRITING NON-STANDARD REGISTER OF STANDARD INTERFACE DEVICE

BACKGROUND OF THE INVENTION

1. Field of the Invention

The present invention relates to a method for reading and writing non-standard register of standard interface device, especially to a method for use of standard command including input no-available parameter to drive the standard interface device to read value of a non-standard register or write data into a non-standard register.

2. Description of the Related Art

Due to progress of computer technology, users have higher requirements for stability, extension and efficiency of peripherals of computers. Thus during development process of computer peripherals, error detection and efficiency analysis of computer peripherals are getting more important. Therefore, research and development staff arranges non-standard registers inside the computer peripherals so as to record the status of peripherals or turn on/off the peripherals, and carry out the analyzing process by reading or changing values of these non-standard registers.

These non-standard registers are hidden inside computer peripherals while an ordinary computer host provides a standard interface that is only applied to read and write registers defined by that standard interface. Thus for reading and writing these non-standard registers of computer peripherals, a Universal Asynchronous Receiver/Transmitter (UART) or Inter Integrated Circuit (I2C) is used. A system chip of computer peripherals only needs two pins to read and write non-standard registers. Thus receiving pins are used to receive values of non-standard registers being intended to be read and write and then transmitting pins are used to transmit contents of non-standard registers. However, such kind of method can only be applied to computer systems with Universal Asynchronous Receiver/Transmitter (UART) or Inter Integrated Circuit (I2C) for retrieving values of non-standard registers. Therefore, it's less flexible on applications.

Furthermore, some manufactures use Vender specific commands to read and write non-standard registers inside the standard interface device. Yet in standard specification of ATA/ATAPI, only command code such as 9Ah, C0h~C3h, 8xh, F0h, F7h, FAh~FFh are reserved for use. Once most of the Vender specific commands is set to have specific function, there is not enough Vender specific commands when research and development staff want to use the Vender specific command to define the standard interface device for executing reading and writing commands of non-standard register.

In view of the foregoing, the present invention is to provide a method for reading and writing non-standard register of standard interface device, which drive the standard interface device to read and write non-standard register by using at least one input no-available parameter of standard command and one output register corresponding to a output no-available parameter in response to the standard command.

SUMMARY OF THE INVENTION

Therefore it is a primary object of the present invention to provide a method for reading and writing non-standard register of standard interface device that sets up command for reading and writing the non-standard register inside standard interface device by providing standard command with input no-available parameter. Thus the standard interface device receives standard command to read or change value of non-standard register. Then by an output register corresponding to the output no-available parameter in response to the standard command, the value of the non-standard register is saved into the output register so that the value of the non-standard register is learned when the value of the output register is read. Therefore, the purpose for reading and writing the non-standard register is achieved.

It is another object of the present invention to provide a method for reading and writing non-standard register of standard interface device that makes the standard interface device detects the confirmation parameter by setting up input no-available parameter of standard command as the confirmation parameter so as to confirm the value of the non-standard register intend to read and write. Thus the standard interface device won't read or change value of the non-standard register under unexpected situation.

By setting up an input no-available parameter of a standard command as an executive parameter and sending the standard command with the executive parameter into the standard interface device, a method for reading and writing non-standard register of standard interface device according to the present invention makes the standard interface device to detect the executive parameter for reading value of the corresponding non-standard register, save value of the non-standard register into the output register, and read the value of the output register for learning the value of the non-standard register. Moreover, the present invention can also make the standard interface device execute issues corresponding to the executive parameter and write the data parameter into the non-standard register that corresponds to the executive parameter by setting up an input no-available parameter of a standard command as an executive parameter and a data parameter.

Furthermore, before setting up the input no-available parameter of the standard command as the executive parameter, the present invention sets up an input no-available parameter of another standard command as a confirmation parameter, sends the standard command with the confirmation parameter into the standard interface device so that the control unit of the standard interface device detects the confirmation parameter for confirming the function of the non-standard register intended to read or write. Or the present invention directly sets up another no-available parameter as a confirmation parameter when sets up the input no-available parameter of the standard command as the executive parameter so that the control unit of the standard interface device detects the confirmation parameter for confirming the function of the non-standard register intended to read or write.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1A is a format list of MEDIA UNLOCK standard command in accordance with the present invention;

FIG. 1B is a format list of the present invention in response to MEDIA UNLOCK standard command;

FIG. 3A is a format list of MEDIA UNLOCK standard command with an executive parameter according to the present invention;

FIG. 3B is a format list of the present invention in response to MEDIA UNLOCK standard command and having value of a non-standard register;

FIG. 5 is a format list of MEDIA UNLOCK standard command with an executive parameter as well as an index parameter according to the present invention;

FIG. 7 is a format list of MEDIA UNLOCK standard command with an executive parameter as well as a data parameter according to the present invention;

FIG. 9 is a format list of MEDIA UNLOCK standard command with an executive parameter, an index parameter and a data parameter according to the present invention;

FIG. 12 is a format list of MEDIA UNLOCK standard command with a plurality of confirmation parameters according to the present invention;

FIG. 13A to FIG. 13C is an another format list of MEDIA UNLOCK standard command with a confirmation parameter according to the present invention;

FIG. 15 is a format list of MEDIA UNLOCK standard command with a plurality of confirmation parameters, an index parameter and an executive parameter according to the present invention.

DETAILED DESCRIPTION OF THE PREFERRED EMBODIMENT

Figure 2:
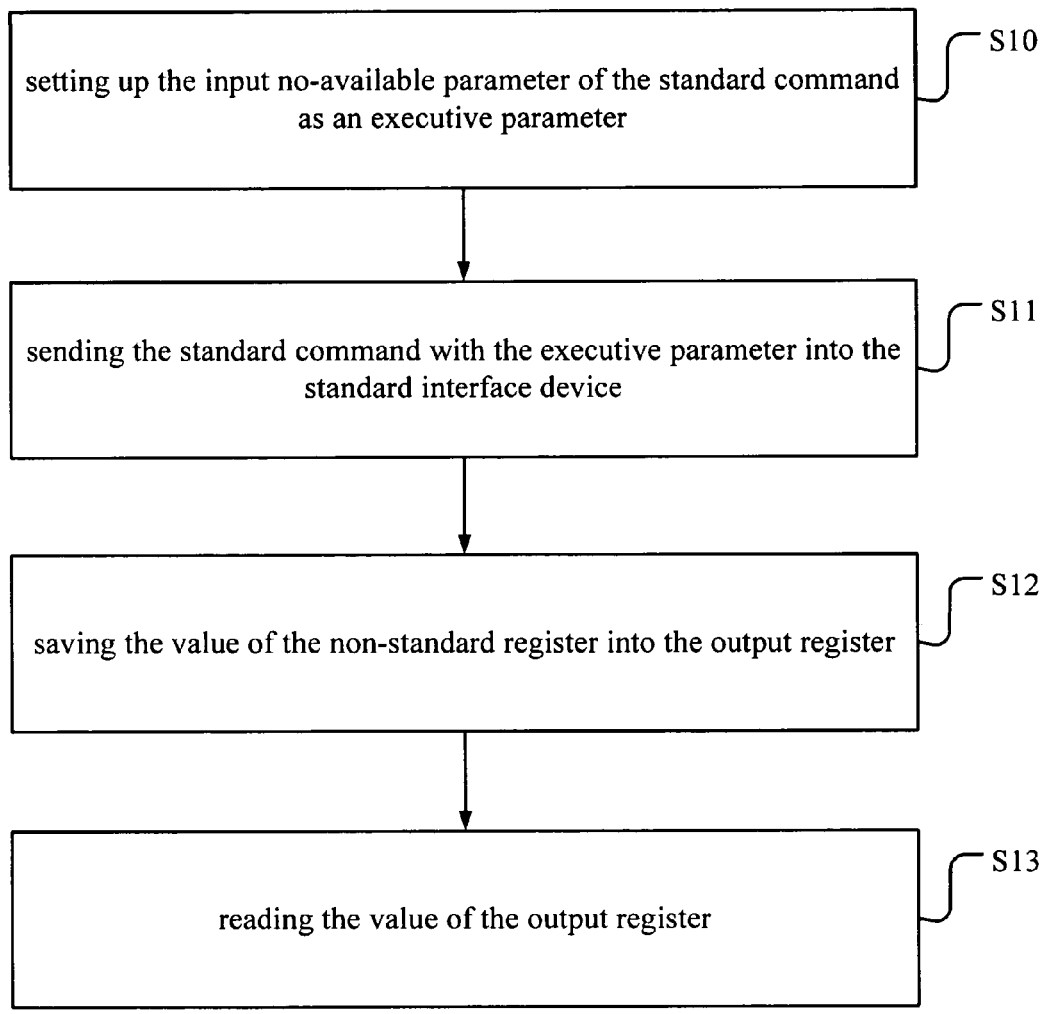
FIG. 2 is a flow chart of the present invention to read value of a non-standard register.

In a prior art, the standard interface device is driven to read and write non-standard register by using UART interface, I2C interface, or vender specific commands. The difference between the present invention and prior art is that the standard interface device reads or changes value of non-standard register while being driven by at least one input no-available parameter of standard command and one output register that corresponds to a output no-available parameter in response to the standard command.

In specification of standard interface such as ATA (Advanced Technology Attachment) and ATAPI (AT Attachment Packet Interface), standard commands are defined. Refer to FIG. 1A, there is a plurality of input parameters including a Features register parameter, a Sector Count register parameter, a LBA Low register parameter, a LBA Mid register parameter and a LBA High register parameter. All above parameters are no-available parameters (na). Because the values of input no-available parameters have no effect on the execution of the standard command, random numbers are chosen to fill in practice; in a device register parameter, except in Bit 4, Bit 5 and Bit 7 need to be set up according to rules of the MEDIA UNLOCK, standard command, the rest Bits are all input no-available parameters, being filled with random numbers. Moreover, a command register parameter is a command code of the standard command. In this embodiment, it is DFh-standard command code of MEDIA UNLOCK.

The method for sending the MEDIA UNLOCK standard command into the standard interface device such as ATA/ATAPI standard interface device is described as following:

In the beginning, input parameters of the MEDIA UNLOCK standard command are set up in sequence. That is—the Features register parameter, the Sector Count register parameter, the LBA Low register parameter, the LBA Mid register parameter, the LBA High register parameter and the Device register parameter are set up sequentially. The values of the above parameters are written and saved into a plurality of corresponding input registers inside standard interface device. Then send and save the Command register parameter into a corresponding command register of the standard interface device. A control unit of the standard interface device detects that command register corresponding to the Command register parameter saves something, it starts decoding and gets input parameter values of the standard command from all input registers corresponding to the MEDIA UNLOCK standard command so as to execute standard issues corresponding to the MEDIA UNLOCK standard command.

When the standard interface device finishes execution of the MEDIA UNLOCK standard command, the control unit of the standard interface device writes output parameters into a plurality of output registers in response to MEDIA UNLOCK standard command. Please refer to FIG. 1B, as shown in figure, the output parameters in response to the MEDIA UNLOCK standard command consist of an Error register parameter, a Sector Count register parameter, a LBA Low register parameter, a LBA Mid register parameter, and a LBA High register parameter. All above output parameters are output no-available parameters. That means the control unit can fill random numbers into the output registers corresponding to the output no-available parameters. In a device register parameter, except Bit 4, Bit 5 and Bit 7 of the output register corresponding to the device register parameter must be filled with output parameters by the control unit in response to the MEDIA UNLOCK standard command, the rest Bits are output no-available parameters that may be filled with random numbers. In a status register parameter, the control unit writes output parameters into Bit 0, Bit 3, Bit 5, Bit 6 and Bit 7 of the output register corresponding to the Status register parameter in response to the MEDIA UNLOCK standard command while the rest Bits are output no-available parameters that may be filled with random numbers.

Refer to FIG. 2, a flow chart of the present invention to read value of non-standard register is disclosed. At least one input no-available parameter of a MEDIA UNLOCK standard command of ATA/ATAPI and an output register corresponding to a output no-available parameter in response to the MEDIA UNLOCK standard command are taken as example to illustrate the process of reading value of a non-standard register set in a standard interface device of ATA/ATAPI. First, as shown in step S10, the input no-available parameter of the standard command is set up as an executive parameter that is saved into a corresponding input register inside the standard interface device. Refer to FIG. 3A, in this embodiment, a parameter of the LBA Mid register of the MEDIA UNLOCK standard command is ACh that is set up as the executive parameter. All input parameters of the MEDIA UNLOCK standard command are set up and saved into the corresponding input registers of the standard interface device. Then, refer to step S11, the standard command with the executive parameter is sent into the standard interface device. That is the value of the Command register parameter in FIG. 3A is sent into the standard interface device. The Command register parameter is set up as standard command code of MEDIA UNLOCK-DFh and the standard command is saved into a corresponding command register inside the standard interface device.

When a control unit of the standard interface device detects the command register saving something, the control unit detects all input registers corresponding to the MEDIA UNLOCK standard command in FIG. 3A. for executing standard issues corresponding to the MEDIA UNLOCK standard command. Moreover, when the control unit detects the value of the LBA Mid register to be ACh, it reads the value of a non-standard register corresponding to the executive parameter. The value of the non-standard register is supposed to be 60h.

Refer to step S12, the value of the non-standard register is saved into the output register. When the control unit finishes the standard issues and intends to write the output parameter into the output register, it takes the value of the non-standard register as output no-available parameter and writes the read value into a corresponding output register. In this embodiment, after the control unit finishing standard issues of MEDIA UNLOCK, the control unit takes the value of the non-standard register as parameter of LBA Mid register in FIG. 3B and saves this value into the corresponding output register-that is LBA Mid register. At last, running the step S13, read the value of the output register. When the control unit finishes standard issues of MEDIA UNLOCK, it makes Bit 7 (BSY) in Status register parameter in FIG. 3B zero. That means the control unit writes zero into Bit 7 of the Status register to represent that the standard interface device has finished the standard issues of MEDIA UNLOCK. At this time, the non-standard register has also been read. Thus when RD personnel learn that the BSY value of the Status register is zero, they can read the value of the LBA Mid register so as to get the value of the non-standard register.

Figure 4:
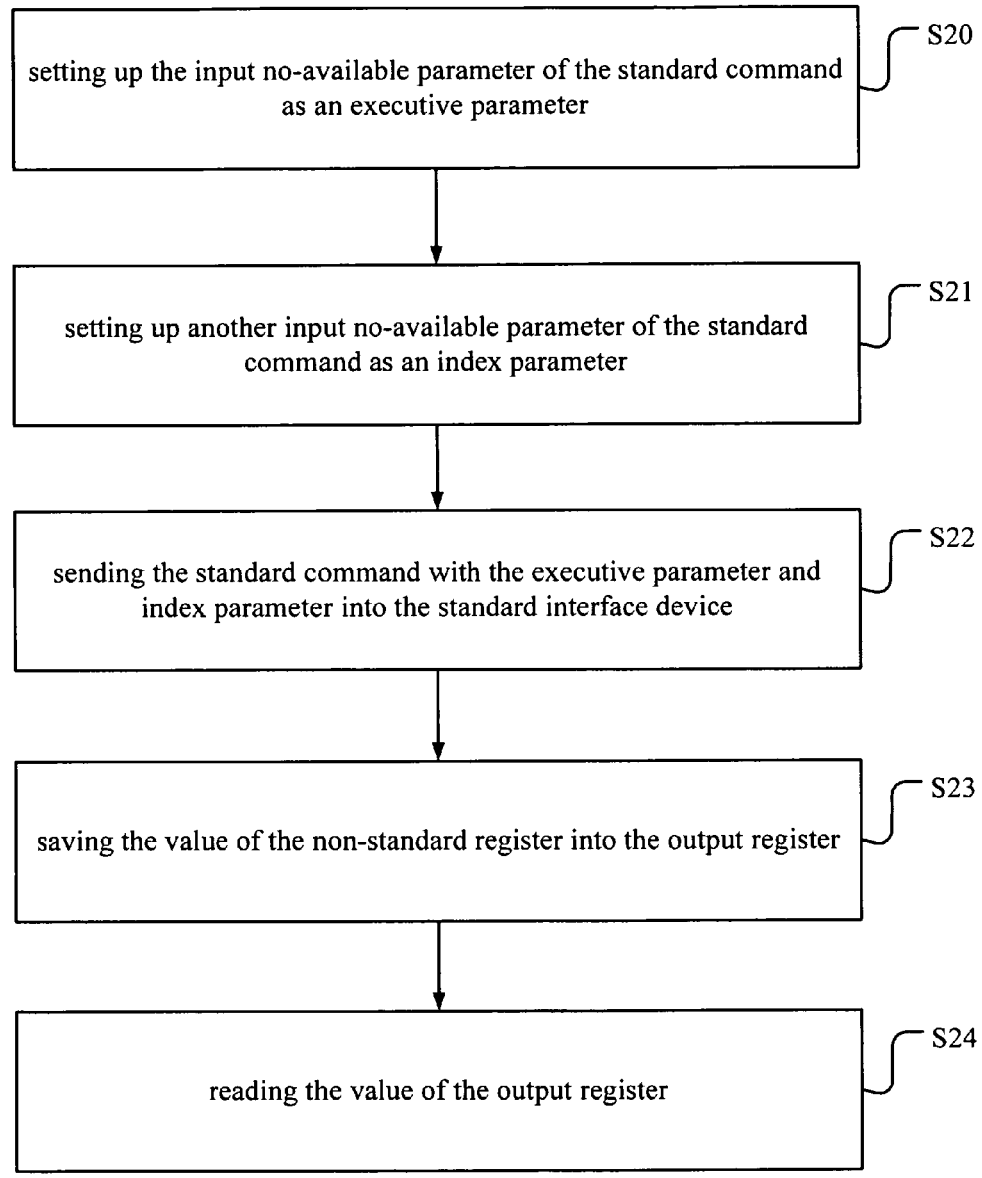
FIG. 4 is another flow chart of the present invention to read value of a non-standard register.

Refer to FIG. 4, another flow chart of the present invention to read value of a non-standard register, when the standard interface device is driven to read value of non-standard register, as shown in step S20 and step S21, in the beginning, an input no-available parameter of the MEDIA UNLOCK standard command is set up as an executive parameter and another input no-available parameter of the MEDIA UNLOCK standard command is set up as an index parameter while the executive parameter and the index parameter are saved into the corresponding input registers inside the standard interface device. As shown in FIG. 5, in this embodiment, a LBA Mid register parameter of the MEDIA UNLOCK standard command is set up as 11h. That is the value of the LBA Mid register parameter is defined as the executive parameter to drive the standard interface device to read the non-standard register. And the LBA High register parameter is set up as AEh-that is the value of the LBA High register parameter is defined as the index parameter of non-standard register intended to be read.

After all input parameters of the MEDIA UNLOCK standard command being set up and saved into the corresponding input registers of the standard interface device, run the step S22, the standard command with the executive parameter as well as the index parameter is sent to the standard interface device and is saved into the corresponding command register inside the standard interface device so as to make the control unit execute standard issues corresponding to the MEDIA UNLOCK standard command. Moreover, when the control unit detects the value of the LBA Mid register to be 11h, it reads the value of a non-standard register corresponding to the index parameter according to the index parameter saved inside the LBA High register. Then, take the step S23 and the step S24 to read the value of the non-standard register. Please refer to FIG. 2, the step S23 and the step S24 are similar to the step S12 and the step S13 in FIG. 2.

Figure 6:
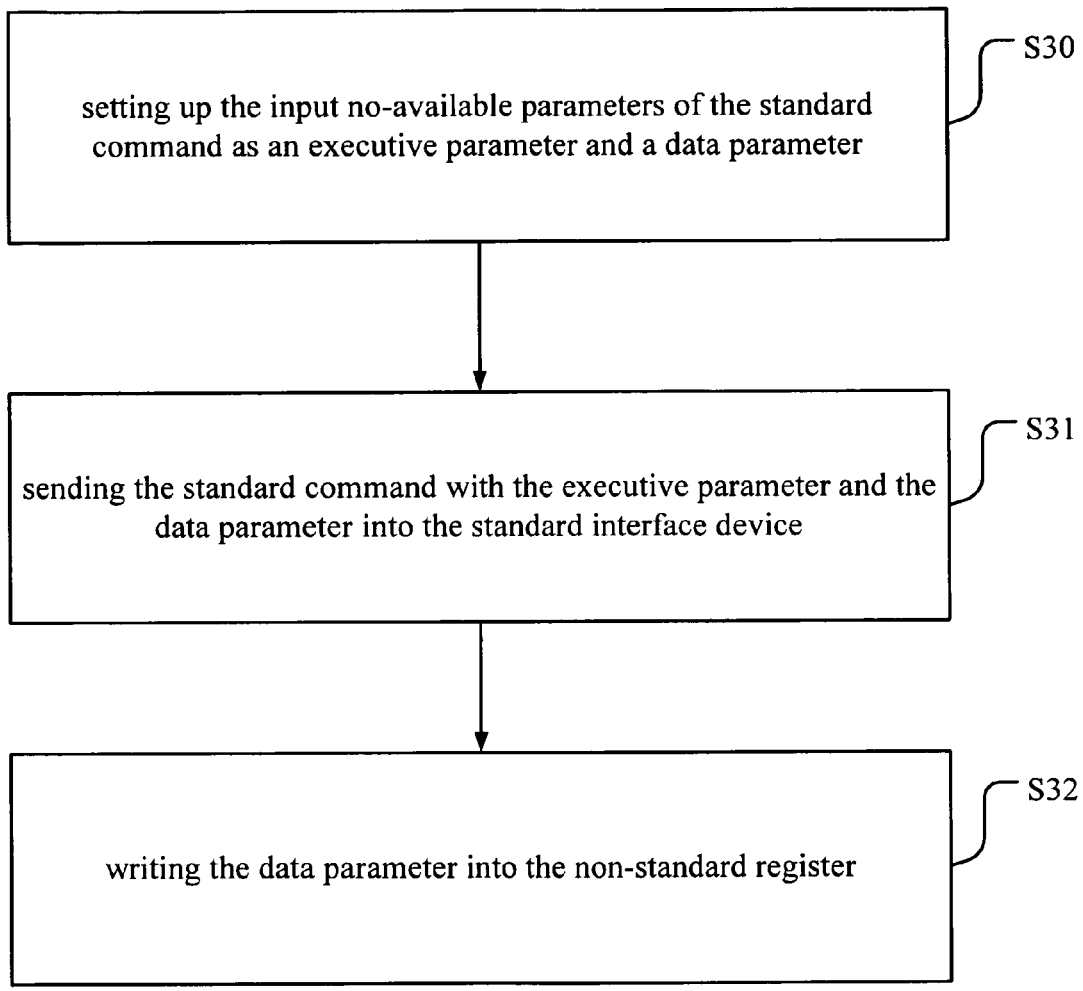
FIG. 6 is a flow chart of the present invention to write data into a non-standard register.

Moreover, refer to FIG. 6, the present invention not only can read the value of the non-standard register but also write data into the non-standard register. First, according to the step S30, set up a plurality of input no-available parameters of the MEDIA UNLOCK standard command as an executive parameter and a data parameter. Both the executive parameter and the data parameter are saved into the corresponding input registers inside the standard interface device. Also refer to FIG. 7, in this embodiment, the LBA Mid register parameter of the MEDIA UNLOCK standard command is set up as the executive parameter for driving the standard interface device to write data into the non-standard register while the LBA Low register parameter is set up as the data parameter intended to be written. The value of the executive parameter is supposed to be FCh while the value of the data parameter is supposed to be 2Dh.

After all input parameters of the MEDIA UNLOCK standard command being set up and saved into the corresponding input registers of the standard interface device, take the step S31, the standard command with the executive parameter as well as the data parameter is sent to the standard interface device and is saved into the command register of the standard interface device so as to make the control unit follow the standard command to execute standard issues corresponding to the MEDIA UNLOCK command and detect the executive parameter for reading the data parameter. At last, as shown in step S32, the data parameter is written into the non-standard register corresponding to the executive parameter.

Figure 8:
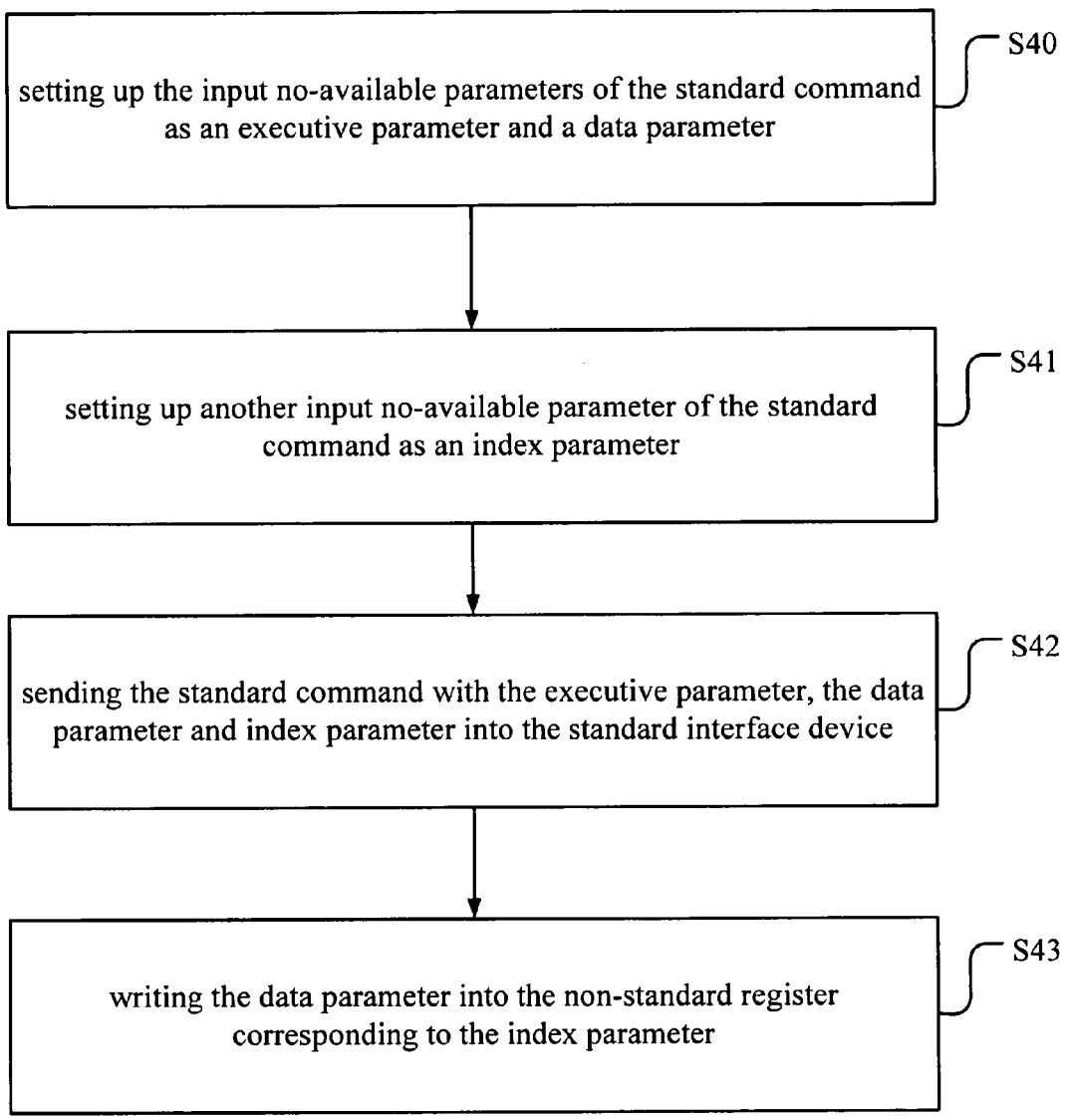
FIG. 8 is another flow chart of the present invention to write data into a non-standard register.

Refer to FIG. 8, a flow chart of writing data into the non-standard register of another embodiment according to the present invention is disclosed. As shown in figure, when the standard interface device is driven to write data into the non-standard register, as shown in step S40 and step S41, set up a plurality of input no-available parameters of the MEDIA UNLOCK standard command as an executive parameter and a data parameter. And another input no-available parameter of the standard command is set up as an index parameter. All the parameters-the executive parameter, the data parameter and the index parameter are saved into the corresponding input registers inside the standard interface device.

Refer to FIG. 9, in this embodiment, the LBA Low register parameter of the MEDIA UNLOCK standard command is set up as the data parameter which the standard interface device intend to write into the non-standard register, the LBA Mid register parameter is set up as the executive parameter for driving the standard interface device to write data into the non-standard register, and the LBA High register parameter is set up as the index parameter of the non-standard register intended to be written. The data parameter is supposed to be 23h, the executive parameter is supposed to be FFh, and the index parameter is supposed to be ADh.

After all input parameters of the MEDIA UNLOCK standard command being set up and saved into the corresponding input registers of the standard interface device, take the step S42, the standard command with the executive parameter, the data parameter and the index parameter is sent to the standard interface device and is saved into the command register of the standard interface device so as to make the control unit follow the standard command to execute the corresponding standard issues and detect the executive parameter for reading the data parameter. At last, take the step S43, the data parameter is written into the non-standard register corresponding to the index parameter.

Figure 10:
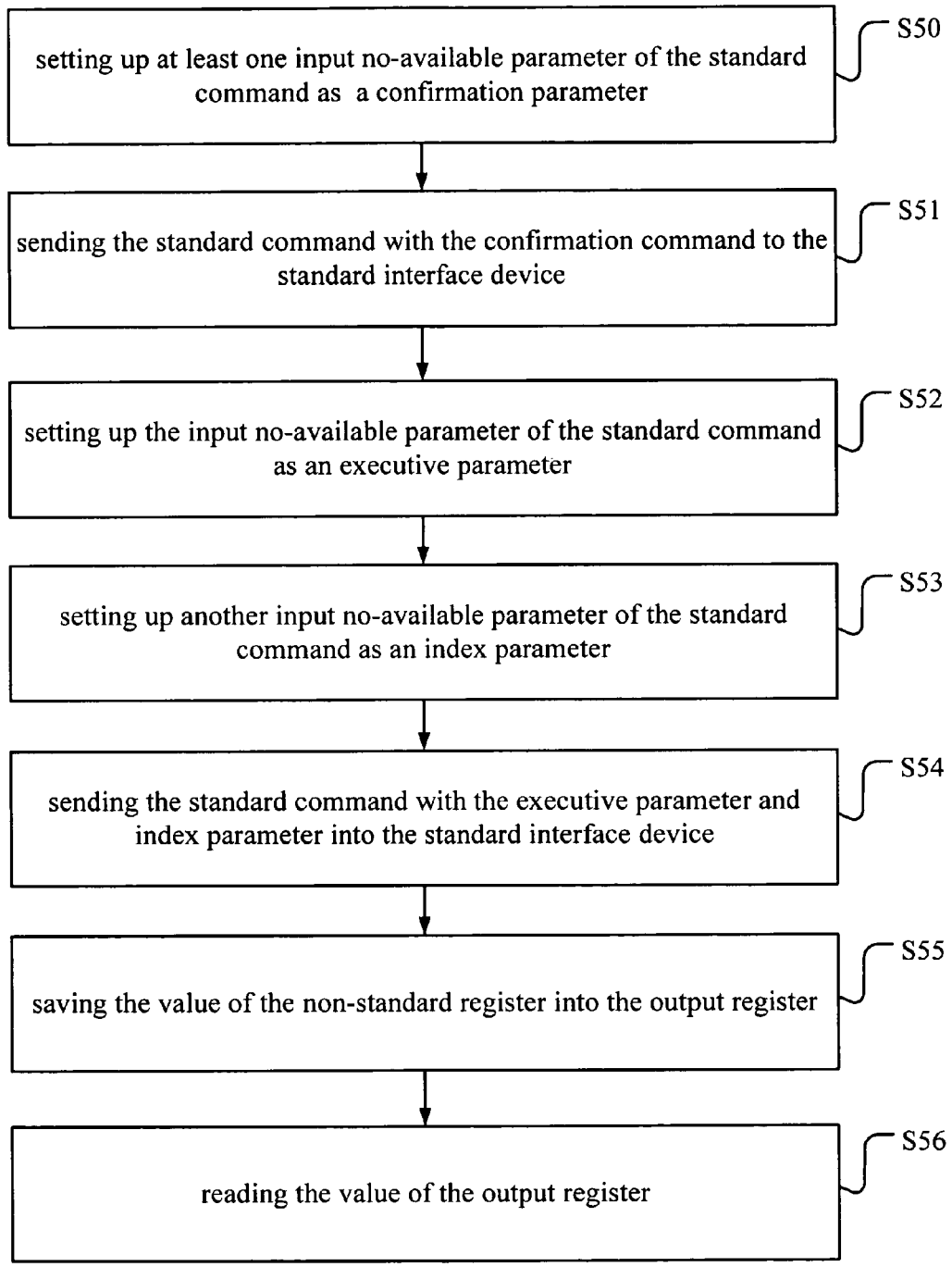
FIG. 10 is a further flow chart of the present invention to read value of a non-standard register.
Figure 11:
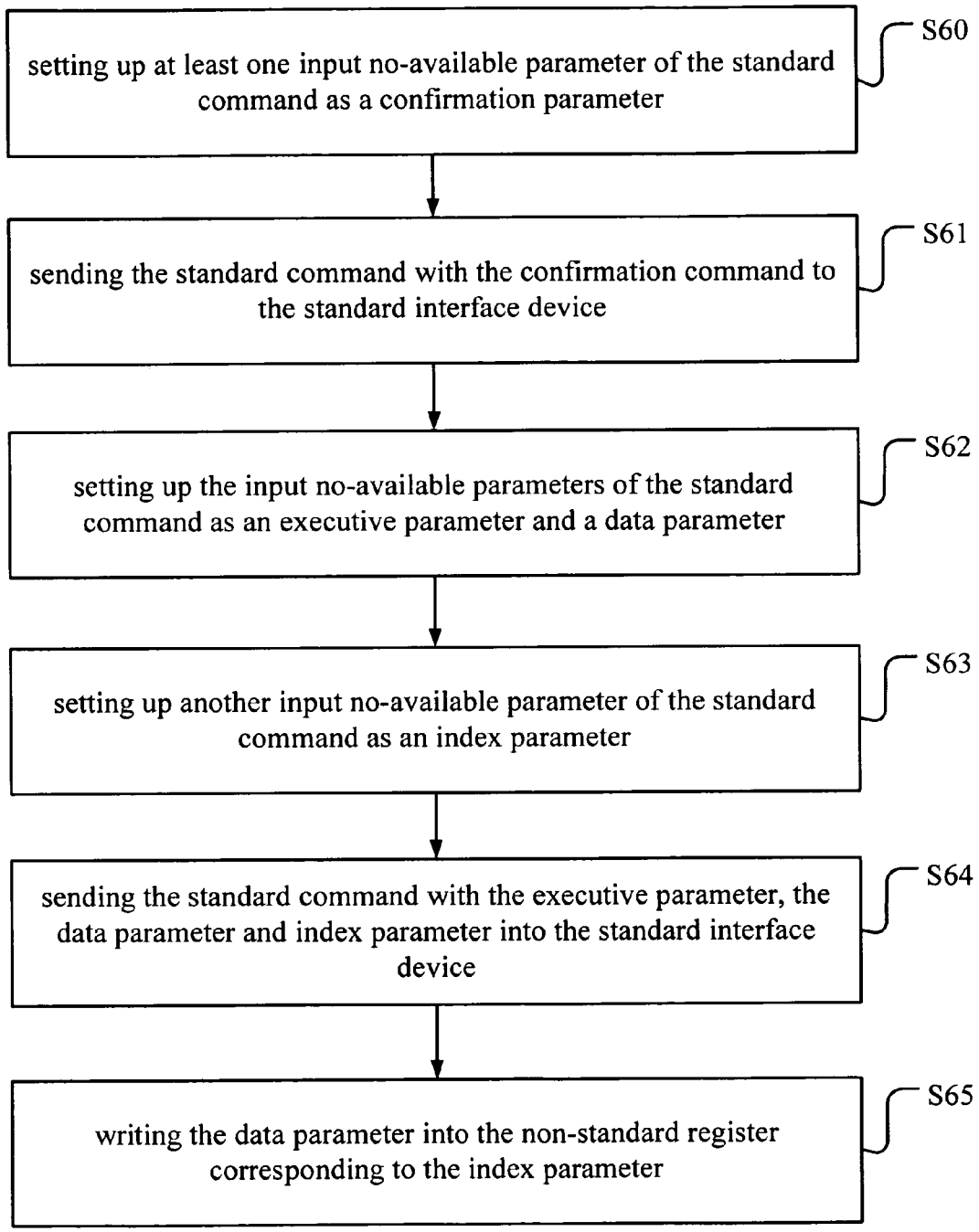
FIG. 11 is a further flow chart of the present invention to write data into a non-standard register.

Because the value of the LBA Mid register parameter of the MEDIA UNLOCK standard command is input no-available parameter which is filled with random number, users sending command may fill in the number of the value of the LBA Mid register parameter that is the same with the executive parameter so as to make the control unit read or write the non-standard register. In order to avoid such situation, please refer to FIG. 10 and FIG. 11. First, as shown in step S50 or S60, at least one input no-available parameter of the standard command is set up as a confirmation parameter that is saved into a corresponding input register inside the standard interface device. Also refer to FIG. 12, the Sector Count register parameter, LBA Low register parameter, and LBA Mid register parameter, these input no-available parameters works as confirmation parameters. They are set up as 01h, 02h, 03h in sequence.

After all input parameters of the MEDIA UNLOCK standard command being set up and saved into the corresponding input registers of the standard interface device, take the step S51 or step S61, send the standard command with the confirmation parameter to the standard interface device and save this standard command with the confirmation parameter into the corresponding command register inside the standard interface device for being detected by the control unit of the standard interface device. When the control unit detects the values of the Sector Count register, LBA Low register, and LBA Mid register are 01h, 02h, 03h respectively, the control unit confirms the user's intention such as to read the value of the non-standard register, write data into the non-standard register, or even shut down the primarily executed standard issues.

Moreover, run from the step S52 to the step S56, set up the input no-available parameter of another standard command for reading the value of the non-standard register. The steps from the step S52 to the step S56 are the same with the steps shown in FIG. 4. Or run from the step S62 to the step 65, set up the input no-available parameters of another standard command for writing data into the non-standard register. The steps from the step S62 to the step 65 are the same with the steps shown in FIG. 8. Furthermore, when the control unit detects the values of the Sector Count register, LBA Low register, and LBA Mid register are 03h, 02h, 01h respectively, the function of reading and writing the non-standard register is shit down and the standard command is recovered to original definition.

In addition, the present invention also provides another method to set up the confirmation parameters for the standard interface device to confirm the value of the non-standard register intended to read or write. Each no-available parameter of a plurality of standard commands is set up as a confirmation parameter. Refer from FIG. 13A to FIG. 13C, the Sector Count register parameters of a plurality of the MEDIA UNLOCK standard commands are set up as 01h, 02h and 03h in sequence and the confirmation parameters are saved into the corresponding input register of the standard interface device sequentially. By successively sending the MEDIA UNLOCK standard commands with the confirmation parameters to the standard interface device, the value of the non-standard register intended to read or write is confirmed when the control unit detects the values of the Sector Count registers are 01h, 02h and 03h sequentially. The values of the Sector Count registers are in reverse sequence is for shutting down the function of reading or writing the non-standard register.

The present invention uses the input no-available parameter of the standard command and an output register that corresponds to the output no-available parameter in responses to the standard command to make the standard interface device read or change the value of the non-standard register.

The present invention is applied to device matching standard interface specifications. Besides application to ATA or ATAPI device, the present invention is also applied to other standard commands with input no-available parameter.

Figure 14:
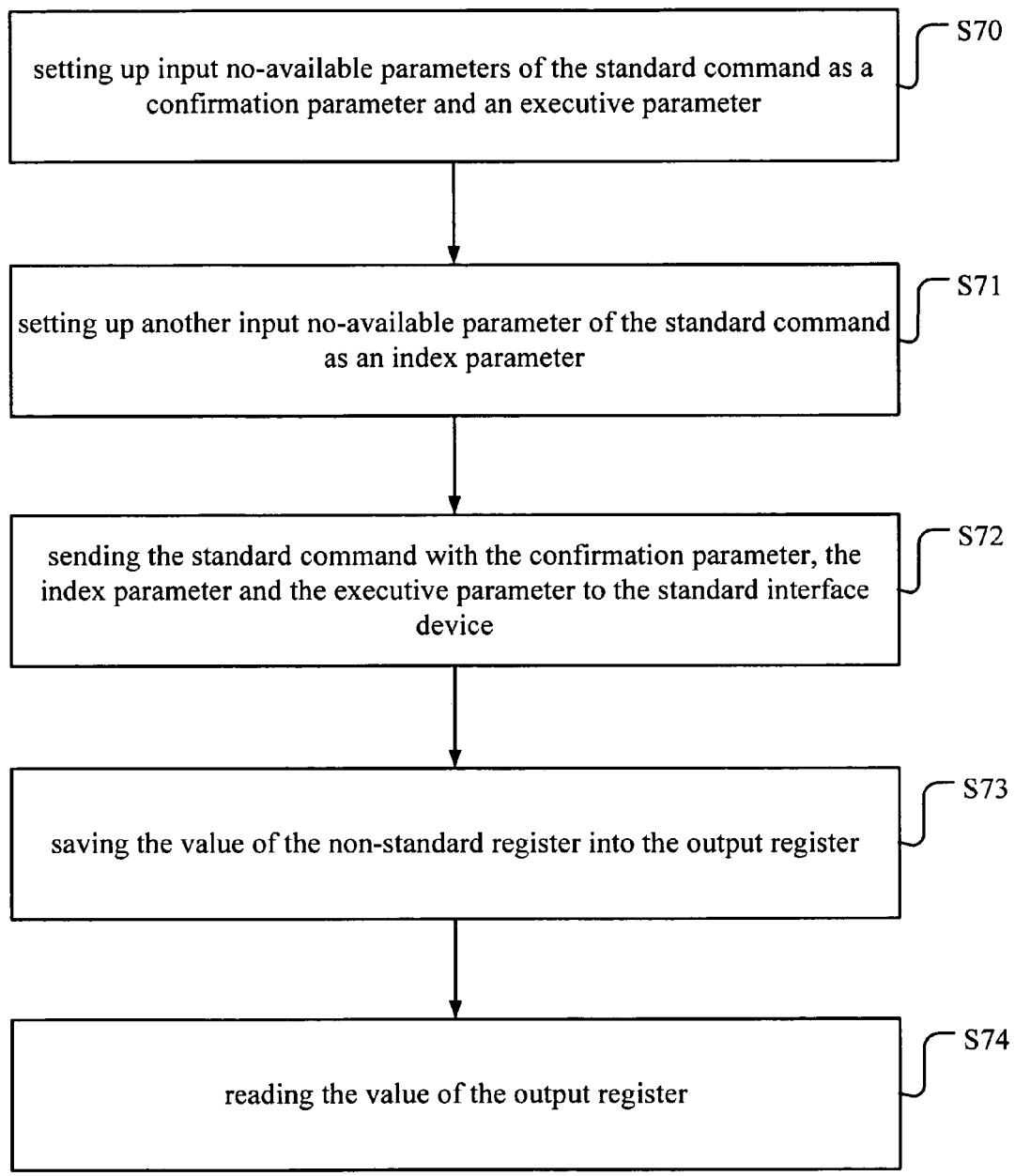
FIG. 14 is a further flow chart of the present invention to read value of a non-standard register.

Refer to FIG. 14, a further embodiment is disclosed. The difference between this embodiment and above embodiment is in that only a plurality of no-available parameters of a standard command is set up for standard interface device for confirmation and reading of the value of the non-standard register intended to read. First, as shown in step S70 and step S71, set up input no-available parameters of the standard command as a confirmation parameter and an executive parameter. And another input no-available parameter of the standard command is set up as an index parameter. The confirmation parameter, the executive parameter and the index parameter are saved into the corresponding input registers inside the standard interface device. With reference to FIG. 15, the Features register parameter, the Sector Count register parameter, and the LBA Low register parameter of the MEDIA UNLOCK standard command are set up as 01h, 02h, 03h in sequence. The LBA Mid register parameter is 11h, set up as the executive parameter. The LBA High register parameter is AEh, set up as the index parameter. There is no need for this embodiment to set up the input no-available parameter of another standard command as the confirmation parameter.

Then take the step S72, send the standard command with the confirmation parameter, the index parameter and the executive parameter to the standard interface device so as to make the control unit confirm the value of the non-standard register intended to be read according to the confirmation parameter as well as the executive parameter, and read the value of the non-standard register corresponding to the index parameter. At last, run the steps from S73 to S74, refer to the step S23 to step S24 shown in FIG. 4. Thereby, the value of the non-standard register is obtained.

Figure 16:
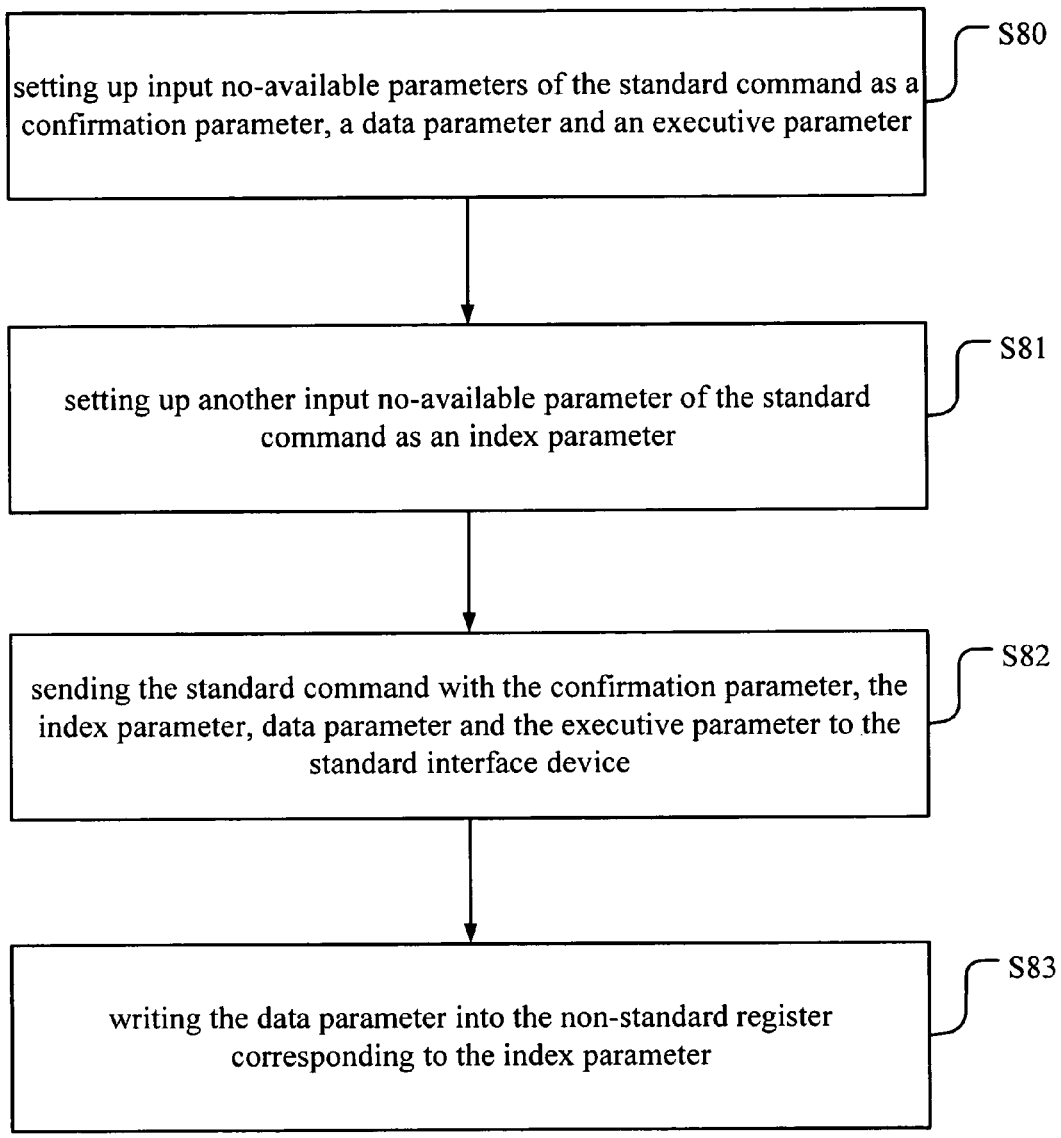
FIG. 16 is a further flow chart of the present invention to write data into a non-standard register.

Refer to FIG. 16, a flow chart of a further embodiment is disclosed. Similar to above embodiment, by setting up a plurality of input no-available parameters of a standard command, the interface device confirms the data intended to be written into the non-standard register of the standard interface device. First, as shown in step S80 and step S81, set up input no-available parameters of the standard command as a confirmation parameter, a data parameter and an executive parameter. And another input no-available parameter of the standard command is set up as an index parameter. The confirmation parameter, the executive parameter, the index parameter and the data parameter are saved into the corresponding input registers inside the standard interface device. Then, take the step S82, send the standard command with the confirmation parameter, the index parameter, the data parameter and the executive parameter to the standard interface device so as to make the control unit confirm the data intended to be written into the non-standard register according to the confirmation parameter as well as the executive parameter, and read the data parameter. At last, according to S83, write the data parameter into the non-standard register corresponding to the index parameter.

In summary, the present invention uses a standard command with at least one input no-available parameter and an output register corresponding to a output no-available parameter in response to the standard command. Setting up the input no-available parameter of the standard command as an executive parameter, the executive parameter is detected by the standard interface device for reading value of a non-standard register. And the value of the non-standard register is saved into the output register so that users read the output register to learn the value of the non-standard register.

Furthermore, when data is intended to write into the non-standard register, the input no-available parameters of the standard command is set up as an executive parameter and a data parameter for the standard interface device to detect the executive parameter and write the data parameter into the non-standard register. Thus a channel is provided to set up a command for reading or writing value of the non-standard register so as to enhance flexibility of reading or writing of the non-standard register.

Additional advantages and modifications will readily occur to those skilled in the art. Therefore, the invention in its broader aspects is not limited to the specific details, and representative device shown and described herein.

Accordingly, various modifications may be made without departing from the spirit or scope of the general inventive concept as defined by the appended claims and their equivalents.

What is claimed is:

1. A method for reading non-standard register of standard interface device using at least one input no-available parameter of a standard command and an output register corresponding to a output no-available parameter in response to the standard command for reading value of a non-standard register inside a standard interface device, comprising:
   setting up the input no-available parameter of the standard command as an executive parameter into the standard interface device;
   sending the standard command with the executive parameter into the standard interface device for the standard interface device to detect the executive parameter and read the value of the non-standard register;
   saving the value of the non-standard register into the output register; and
   reading the value of the output register.

2. The method as claimed in claim 1, wherein before the step of setting up the input no-available parameter of the standard command as an executive parameter into the standard interface device, further comprising:
   setting up the input no-available parameter of another standard command as a confirmation parameter into the standard interface device; and
   sending the standard command with the confirmation parameter into the standard interface device for the standard interface device to detect the confirmation parameter and to confirming the value of the non-standard register intended to read.

3. The method as claimed in claim 1, wherein the step of setting up the input no-available parameter of the standard command as an executive parameter into the standard interface device, further comprising:
   saving the executive parameter into a corresponding register of the standard interface device for being detected by a control unit of the standard interface device.

4. The method as claimed in claim 1, wherein the step of setting up the input no-available parameter of the standard command as an executive parameter into the standard interface device, further comprising:
   setting up another input no-available parameter of the standard command as an index parameter into the standard interface device so that according to the index parameter, the standard interface device reads the value of the non-standard register corresponding to the index parameter.

5. The method as claimed in claim 1, wherein the step of setting up the input no-available parameter of the standard command as an executive parameter into the standard interface device, further comprising:
   setting up another input no-available parameter of the standard command as a confirmation parameter into the standard interface device for the standard interface device to detect the confirmation parameter and to confirm the value of the non-standard register intended to read.

6. The method as claimed in claim 1, wherein the step of sending the standard command with the executive parameter into the standard interface device, further comprising:
   saving the standard command with the executive parameter into a corresponding command register of the standard interface device for being detected by a control unit of the standard interface device.

7. The method as claimed in claim 1, wherein the standard interface device is an ATA device.

8. The method as claimed in claim 1, wherein the standard interface device is an ATAPI device.

9. The method as claimed in claim 2, wherein the step of setting up the input no-available parameter of another standard command as a confirmation parameter into the standard interface device, further comprising:
   saving the confirmation parameter into a corresponding input register of the standard interface device so that a control unit of the standard interface device detects the confirmation parameter.

10. The method as claimed in claim 2, wherein the step of sending the standard command with the confirmation parameter into the standard interface device, further comprising:
    saving the standard command with the confirmation parameter into a corresponding command register of the standard interface device for being detected by a control unit of the standard interface device.

11. The method as claimed in claim 4, wherein the step of setting up another input no-available parameter of the standard command as an index parameter into the standard interface device, further comprising:
    saving the index parameter into a corresponding input register of the standard interface device for being detected by a control unit of the standard interface device.

12. The method as claimed in claim 5, wherein the step of setting up another input no-available parameter of the standard command as a confirmation parameter into the standard interface device, further comprising:
    saving the confirmation parameter into a corresponding input register of the standard interface device for being detected by a control unit of the standard interface device.

13. A method for writing non-standard register of standard interface device using a plurality of input no-available parameters of a standard command to write data into a non-standard register inside a standard interface device, comprising:
    setting up the input no-available parameters of the standard command as an executive parameter and a data parameter into the standard interface device;
    sending the standard command with the executive parameter and the data parameter into the standard interface device for the standard interface device to detect the executive parameter for reading the data parameter; and
    writing the data parameter into the non-standard register.

14. The method as claimed in claim 13, wherein before the step of setting up the input no-available parameters of the standard command as an executive parameter and a data parameter into the standard interface device, further comprising:
    setting up at least one input no-available parameter of another standard command as a confirmation parameter into the standard interface device; and sending the standard command with the confirmation parameter into the standard interface device for the standard interface device to detect the confirmation parameter and to confirming the data parameter intended to write into the non-standard register.

15. The method as claimed in claim 13, wherein the step of setting up the input no-available parameters of the standard command as an executive parameter and a data parameter into the standard interface device, further comprising:

saving the executive parameter into a corresponding input register of the standard interface device for being detected by a control unit of the standard interface; and saving the data parameter into a corresponding input register of the standard interface device for being read by the control unit.

16. The method as claimed in claim 13, wherein the step of setting up the input no-available parameters of the standard command as an executive parameter and an data parameter into the standard interface device, further comprising:

setting up another input no-available parameter of the standard command as an index parameter into the standard interface device so that the standard interface device writes the data parameter into the non-standard register according to the index parameter.

17. The method as claimed in claim 13, wherein the step of setting up the input no-available parameters of the standard command as an executive parameter and a data parameter into the standard interface device, further comprising:

setting up another input no-available parameter of the standard command as a confirmation parameter into the standard interface device for the standard interface device to detect the confirmation parameter and to confirming the data parameter intended to write into the non-standard register.

18. The method as claimed in claim 13, wherein the step of sending the standard command with the executive parameter and the data parameter into the standard interface device, further comprising:

saving the standard command with the executive parameter and the data parameter into a corresponding command register of the standard interface device for being detected by a control unit of the standard interface device.

19. The method as claimed in claim 13, wherein the standard interface device is an ATA device.

20. The method as claimed in claim 13, wherein the standard interface device is an ATAPI device.

21. The method as claimed in claim 14, wherein the step of setting up at least one input no-available parameter of another standard command as a confirmation parameter into the standard interface device, further comprising:

saving the confirmation parameter into a corresponding input register of the standard interface device for being detected by a control unit of the standard interface device.

22. The method as claimed in claim 14, wherein the step of sending the standard command with the confirmation parameter into the standard interface device, further comprising:

saving the standard command with the confirmation parameter into a corresponding command register of the standard interface device for being detected by a control unit of the standard interface device.

23. The method as claimed in claim 16, wherein the step of setting up another input no-available parameter of the standard command as an index parameter into the standard interface device, further comprising:

saving the index parameter into a corresponding input register of the standard interface device for being detected by a control unit of the standard interface device.

24. The method as claimed in claim 17, wherein the step of setting up another input no-available parameter of the standard command as a confirmation parameter into the standard interface device, further comprising:

saving the confirmation parameter into a corresponding input register of the standard interface device for being detected by a control unit of the standard interface device.

* * * * *